(12) United States Patent
Matsui et al.

(10) Patent No.: US 7,964,265 B2
(45) Date of Patent: Jun. 21, 2011

(54) BIAXIALLY ORIENTED POLYESTER FILM AND METALLIC LAMINATED FILM

(75) Inventors: Ryosuke Matsui, Kyoto (JP); Isao Manabe, Otsu (JP); Yosuke Takizawa, Gifu (JP); Saori Sumi, Otsu (JP); Masahiro Kimura, Kyoto (JP)

(73) Assignee: Toray Industries, Inc. (JP)

( * ) Notice: Subject to any disclaimer, the term of this patent is extended or adjusted under 35 U.S.C. 154(b) by 812 days.

(21) Appl. No.: 11/887,461

(22) PCT Filed: Mar. 28, 2006

(86) PCT No.: PCT/JP2006/306202
§ 371 (c)(1),
(2), (4) Date: Oct. 16, 2007

(87) PCT Pub. No.: WO2006/104116
PCT Pub. Date: Oct. 5, 2006

(65) Prior Publication Data
US 2009/0123697 A1    May 14, 2009

(51) Int. Cl.
B32B 15/08 (2006.01)
B32B 15/09 (2006.01)
B32B 27/08 (2006.01)
B32B 27/36 (2006.01)

(52) U.S. Cl. ........ 428/141; 428/457; 428/458; 428/480; 428/910

(58) Field of Classification Search ............... None
See application file for complete search history.

(56) References Cited

U.S. PATENT DOCUMENTS

| | | | |
|---|---|---|---|
| 4,493,872 A * | 1/1985 | Funderburk et al. | 428/332 |
| 4,797,317 A * | 1/1989 | Oliver et al. | 428/204 |
| 4,921,764 A * | 5/1990 | Rudd et al. | 428/480 |
| 6,610,378 B1 * | 8/2003 | Kimura et al. | 428/35.8 |
| 2002/0024750 A1 | 2/2002 | Secanu | |
| 2002/0045039 A1 | 4/2002 | Peiffer et al. | |
| 2002/0051872 A1 | 5/2002 | Bartsch et al. | |
| 2009/0311493 A1 * | 12/2009 | Manabe et al. | 428/195.1 |
| 2010/0104882 A1 * | 4/2010 | Yamamura et al. | 428/480 |

FOREIGN PATENT DOCUMENTS

| | | |
|---|---|---|
| DE | 100 38 131 A1 | 2/2002 |
| EP | 1 176 005 A2 | 1/2002 |
| EP | 1 176 055 A1 | 1/2002 |
| JP | 48-61556 | 8/1973 |
| JP | 51-12860 | 1/1976 |
| JP | 53-41355 | 4/1978 |
| JP | 54-90397 A | 7/1979 |
| JP | 55-20496 A | 2/1980 |
| JP | 59-204617 A | 11/1984 |
| JP | 7-314625 A | 12/1995 |
| JP | 11-216823 A | 8/1999 |
| JP | 2000-94575 A | 4/2000 |
| JP | 2000-129855 A | 5/2000 |
| JP | 2000-238183 A | 9/2000 |
| JP | 2001-59320 A | 3/2001 |
| JP | 2001-347565 * | 12/2001 |
| JP | 2001-347565 A | 12/2001 |
| JP | 2002-307616 A | 10/2002 |
| JP | 2002-337225 * | 11/2002 |
| JP | 2002-337225 A | 11/2002 |
| JP | 2003-337225 * | 11/2002 |
| JP | 2002-370311 A | 12/2002 |
| JP | 2003-94556 A | 4/2003 |
| JP | 2003-226762 A | 8/2003 |
| JP | 2004-010711 * | 1/2004 |
| JP | 2004-75713 A | 3/2004 |
| JP | 2004-98485 A | 4/2004 |
| JP | 2004-122669 A | 4/2004 |
| JP | 2004-130592 A | 4/2004 |
| JP | 2005-297283 * | 10/2005 |

* cited by examiner

Primary Examiner — Vivian Chen
(74) Attorney, Agent, or Firm — DLA Piper LLP (US)

(57) ABSTRACT

A biaxially oriented polyester film includes at least three polyester resin layers A1/B/A2, and has a melting point in the range of 246 to 270° C. The major component of the layers A1 and A2 is polyethylene terephthalate and the stress at 100% elongation in the film's longitudinal direction and width direction at 150° C. and 200° C. meets the following equations: $2 \leq (F100_{MD} + F100_{TD}) \leq 100$ and $1 \leq F100_{TD} \leq 60$. The film has a high dimensional stability at high temperatures to permit uniform metal deposition, suffers little change in appearance during thermoforming, and serves for easy production of formed parts that closely meet the shape of the die when subjected to low-stress forming.

12 Claims, No Drawings

BIAXIALLY ORIENTED POLYESTER FILM AND METALLIC LAMINATED FILM

RELATED APPLICATION

This is a §371 of International Application No. PCT/JP2006/306202, with an international filing date of Mar. 28, 2006 (WO 2006/104116 A1, published Oct. 5, 2006), which is based on Japanese Patent Application Nos. 2005-091124, filed Mar. 28, 2005, and 2005-328417, filed Nov. 14, 2005.

TECHNICAL FIELD

This disclosure relates to a biaxially oriented polyester film, in particular, a biaxially oriented polyester film that is useful as material for formed parts with a plated metal-like appearance that is produced by deposition of metal on the surface of a film and subsequent forming of the film.

BACKGROUND

Recently, different members with a metallic appearance that is produced by plating injection-molded resin articles have been used in the field of building materials, automobile components, portable telephones, electrical appliances, etc. However, as people have a growing interest in environmental issues, environmental influence of plating solutions used in the plating baths for processing those resin articles are increasingly seen as a serious problem. In particular, efforts are needed for prevention of leak of plating solutions, and there is a tendency to strengthen regulations on the compounds contained in such plating solutions.

Under such circumstance, some people have proposed in recent years that metallic formed parts that are produced by metal deposition on polyester film and subsequent forming should be used instead of plated parts. Such proposals include, for example, automobile components produced from metal-deposited, undrawn polyester film laminated to a resin sheet (see, for example, Japanese Unexamined Patent Publication (Kokai) Nos. 2004-98485). This proposal, however, uses an undrawn film which cannot have a high dimensional stability at high temperatures, and it is difficult to achieve uniform metal deposition. Furthermore, the resulting formed parts would suffer quality deteriorate with over time and would be low in chemical resistance. Other studies have proposed that in the case of biaxial orientation as well, such formed parts can be produced by using film of a copolyester with a relatively low melting point (see, for example, Japanese Unexamined Patent Publication (Kokai) Nos. 2004-122669 and 2004-130592). In such proposed film, however, the copolyester used is low in crystallinity, and therefore, noticeable spherulite growth takes place during the thermoforming process, and the film is likely to suffer white turbidity before and after the forming process, leading to formed parts with a poor appearance.

To solve this problem, the use of easily moldable film of polyethylene terephthalate which has a high melting point has been proposed (see, for example, Japanese Unexamined Patent Publication (Kokai) No. 2001-347565), such proposed film requires a very large stress for deformation, and therefore, it is difficult to form it into required parts through a thermoforming process.

In another proposal, polyethylene terephthalate and polybutylene terephthalate is mixed to provide polyester film which is used to produce metal containers after being laminated to a metal plate (see, for example, Japanese Unexamined Patent Publication (Kokai) No. HEI 7-314625). In this proposal, however, the film is combined with a metal plate ten times as thick as the film by thermal adhesion with a low melting point polyester layer provided between them. The deforming stress for the forming is exerted mainly to the metal plate, and therefore the formability of the film itself has not a significant influence. However, an extremely large deforming stress will be required if forming is to be performed to produce such formed parts. Such forming would be virtually impossible.

It could therefore be advantageous to provide a film having a high dimensional stability at high temperatures to permit uniform metal deposition, suffering little changes in appearance during thermoforming, and being easy form at a low stress into the shape defined by the die. It could also be advantageous to provide a metallic film having a good metallic appearance and suffering little changes in appearance during thermoforming.

SUMMARY

We provide a biaxially oriented polyester film comprising at least three polyester resin layers A1/B/A2, and having a melting point in the range of 246 to 270° C., wherein the major component of the layer A is polyethylene terephthalate and the stress at 100% elongation in the film's longitudinal direction and width direction at 150° C. and 200° C. meet the following equations 1 and 2:

$$2 \leq (F100_{MD} + F100_{TD}) \leq 100 \quad (1)$$

$$1 \leq F100_{TD} \leq 60 \quad (2)$$

where $F100_{MD}$ is the stress at 100% elongation in the film's longitudinal direction (MPa), and $F100_{TD}$ is the stress at 100% elongation in the film's width direction (MPa).

We also provide a biaxially oriented polyester film comprising at least three polyester resin layers A1/B/A2, and having a melting point in the range of 246 to 270° C., wherein the major component of the layer A is polyethylene terephthalate and the film is a metallic laminated film comprising a thin metal layer on at least one side of the film, the adhesion between the film and the thin metal layer being 3.5 N/10 mm or more, and the stress at 100% elongation in the film's longitudinal direction and width direction at 150° C. and 200° C. meeting the equations 1 and 2:

$$2 \leq (F100_{MD} + F100_{TD}) \leq 100 \quad (1)$$

$$1 \leq F100_{TD} \leq 60 \quad (2).$$

DETAILED DESCRIPTION

Our polyester films should have a melting point in the range of 246 to 270° C. to have a high dimensional stability at high temperatures, along with a metal deposition suitability. If the melting point is 245° C. or below, the film will be poor in heat resistance and can suffer reduced transparency during a film's fabrication process such as thermoforming. If the melting point is above 270° C., on the other hand, the melting point will be so high that it is impossible in some cases to achieve a required adhesion with the thin metal layer produced by the metal deposition. To achieve both a required dimensional stability at high temperatures and a required deposition suitability, the polyester film should preferably have a melting point in the range of 246 to 265° C., more preferably 246 to 255° C. The melting point of the polyester film is defined as the temperature of the endoergic peak determined when measurement is carried out with a differential scanning calorimeter (DSC) at a temperature increase rate of 20° C./min. Two or more endoergic peaks can take place if polyester resins with different compositions are laminated or if a blend of polyester resins with different compositions is used. In such cases, the melting point of the polyester film is defined as the temperature of the endoergic peak that appears at the highest temperature. For a polyester film to have a melting point in such a temperature range, the polyester resin material to be used for the film production should preferably have a melting point in the range of 246 to 270° C. If a polyester resin with a melting point of 246° C. or above is to be blended with another polyester resin with a melting point lower than 246° C., it is preferred that the catalyst remaining in the resins be inactivated or an appropriate phosphorus compound be added to decrease the catalytic capacity in advance in order to prevent the melting point from being decreased as a result of the ester exchange reaction that can occur in the resins during the melting and kneading processes. It is also preferred to use a polyester resin that does not contain a significant amount of residual catalysts.

The polyester that constitutes the polyester film refers generally to a polymer compound in which the major bond in the backbone chain is an ester bond, and normally produced by carrying out a polycondensation reaction of a dicarboxylic acid compound with a glycol compound, or a dicarboxylate derivative with a glycol compound. Here, useful dicarboxylic acid compounds include, for example, aromatic dicarboxylic acids such as terephthalic acid, 2,6-naphthalene dicarboxylic acid, isophthalic acid, diphenyl dicarboxylic acid, diphenyl sulfone dicarboxylic acid, diphenoxyethane dicarboxylic acid, 5-sodiumsulfone dicarboxylic acid, phthalic acid; aliphatic dicarboxylic acids such as oxalic acid, succinic acid, adipic acid, sebacic acid, dimer acid, maleic acid, fumaric acid; alicyclic dicarboxylic acids such as 1,4-cyclohexanedicarboxylic acid; and oxycarboxylic acids such as parahydroxybenzoic acid. Useful dicarboxylate derivatives include esterification products of the above-mentioned dicarboxylic acid compounds, such as, for example, dimethyl terephthalate, diethyl terephthalate, 2-hydroxyethyl methyl terephthalate, 2,6-dimethyl naphthalene dicarboxylate, dimethyl isophthalate, dimethyl adipate, diethyl maleate, and dimethyl dimerate. Useful glycol compounds include, for example, aliphatic dihydroxy compounds such as ethylene glycol, 1,2-propanediol, 1,3-propanediol, 1,3-butanediol, 1,4-butanediol, 1,5-pentanediol, 1,6-hexanediol, and neopentyl glycol; polyoxyalkylene glycols such as diethylene glycol, polyethylene glycol, polypropylene glycol, and polytetramethylene glycol; alicyclic dihydroxy compounds such as 1,4-cyclohexanedimethanol; and aromatic dihydroxy compounds such as bisphenol A, and bisphenol S. Of these, preferred dicarboxylic acid compounds include terephthalic acid, 2,6-naphthalene dicarboxylic acid, isophthalic acid, and dimethyl ester derivatives thereof while preferred glycol compounds include ethylene glycol, 1,3-propanediol, 1,4-butanediol, and 1,4-cyclohexanedimethanol.

From the viewpoint of aesthetic properties etc., the polyester film of the invention should have a three-layer structure, such as A1/B/A2, comprising polyester resin, where the major component of the layer A is polyethylene terephthalate. The expression "the major component is polyethylene terephthalate" means that polyethylene terephthalate accounts for 80% or more by mass of the total mass of the layer A. The content of polyethylene terephthalate should preferably be 90% or more by mass, particularly preferably 95% or more by mass. Further, the term "polyethylene terephthalate" refers to a polyester material in which ethylene terephthalate units account for 80 mol % or more. From the viewpoint of the plated metal-like appearance of the film, polyethylene terephthalate in which ethylene terephthalate units accounts for 90 mol % or more is more preferable, and polyethylene terephthalate in which ethylene terephthalate units accounts for 97 mol % or more is particularly preferable. Layer A comprises a layer A1 and a layer A2. Layer A1 and layer A2 sandwich a layer B between them. For layer A, layer A1 and layer A2 may have either the same composition or different compositions as long as they meet the above-mentioned requirements for composition. Furthermore, the layer A1 and the layer A2 each may consist of more than one sublayer. However, if the glass transition temperature of the layer A1 and that of the layer A2 differ by 20° C. or more, the film can curl, leading to a deterioration of the handleability. Therefore, the difference in the glass transition temperature of the layer A1 and that of the layer A2 should preferably be less than 20° C., more preferably less than 10° C. For the polyester film, moreover, the glass transition temperature of the layer A should preferably be higher than that of the layer B in order to meet all requirements for formability as well as the appearance and aesthetic properties of the formed products. If the glass transition temperature of the layer A is lower than that of the layer B, undesired adhesion spots may be left after the film production process to cause a deterioration in appearance. To prevent adhesion of the film to the heating roller during the film production process, the glass transition temperature of the layer A should preferably be in the range of 60 to 90° C., more preferably 65 to 85° C.

From the viewpoint of the formability of the polyester film, the ethylene glycol residue should preferably account for 60 to 90 mol % and the 1,4-butanediol residue should preferably account for 10 to 30 mol % of the total glycol residue in the component polyester resin in the layer B. The content of the 1,4-butanediol residue should more preferably be in the range of 15 to 25 mol %. Other glycol residue may be contained if its content is 10 mol % or below. If such other glycol residue is contained, its content should preferably be in the range of 1 to 10 mol %, more preferably 1 to 5 mol %. There are no specific limitations on such other glycol residue components, but preferred ones include 1,4-cyclohexanedimethanol residue, neopentyl glycol residue, and 1,3-propanediol. Furthermore, such other glycol residue components also include diethylene glycol residue that results as a by-product from the polyethylene terephthalate production process. More than types of glycol residue may be contained as such other glycol residue. Here, each glycol residue component may be contained in the polyester as a component of a copolymer, or several polyester resins containing separate glycol residues may be blended in the film. Or, such a blend and such a copolymer may be used in combination. However, copolymerization is undesirable in some cases because it can cause a decrease in melting point, leading to a decreased heat resistance. Therefore, it is particularly preferred that the film comprises a blend of several polyester resins that separately contain different glycol residue components.

From the viewpoint of formability of the polyester film, furthermore, the terephthalic acid residue should preferably account for 95 mol % or more of the total dicarboxylic acid residue in the polyester resin in the layer B. Furthermore, it is preferred that the terephthalic acid residue account for 95 to 99 mol % of the dicarboxylic acid residue while the other dicarboxylic acid residue components account for 1 to 5 mol %. It is more preferred that the content of such other dicarboxylic acid residue components is in the range of 1 to 3 mol %. The terephthalic acid residue and the other dicarboxylic acid residue may be in the polyester as components of a copolymer. However, copolymerization may cause a decrease in the melting point, and therefore, from the viewpoint of heat resistance, it is preferred that they exist in different polyester resins, which are blended in the film. Such a copolymer and blend may be used in combination. There are no specific limitations on the other dicarboxylic acid residue components, useful ones include 2,6-naphthalene dicarboxylic acid residue, isophthalic acid residue, 5-sodium sulfoisophthalic acid residue, adipic acid residue, sebacic acid residue, dimer acid residue, and 1,4-cyclohexanedicarboxylic acid residue. Isophthalic acid residue is particularly preferred.

From the viewpoint of the film's properties relating to fabrication processes such as thermoforming, the stress at 100% elongation (F100 value) of the polyester film of the invention meet the following equations 1 and 2 at 150° C. and 200° C. in the film's longitudinal direction and width direction:

$$2 \leq (F100_{MD} + F100_{TD}) \leq 100 \tag{1}$$

$$1 \leq F100_{TD} \leq 60 \tag{2}.$$

$F100_{MD}$ denotes the stress at 100% elongation in the film's longitudinal direction (in MPa), while $F100_{TD}$ denotes the stress at 100% elongation in the film's width direction (in MPa). The stress at 100% elongation referred herein is defined as the stress caused in the film when the film is stretched by 100%.

If the $(F100_{MD} + F100_{TD})$ term in the equation (1) is less than 2 MPa, the film will not able to resist the tension that is caused by the conveyance during the deposition process or the preheat process for forming, leading to deformation, or even fracture, of the film. If $(F100_{MD} + F100_{TD})$ exceeds 100 MPa, on the other hand, the film cannot deform sufficiently during the thermoforming process to suit itself to the die, and resulting products will not serve properly as formed parts. To ensure required handleability and formability, the value of $(F100_{MD} + F100_{TD})$ at 150° C. and 200° C. should preferably be in the range of, 5 to 80 MPa, more preferably 5 to 60 MPa, still more preferably 10 to 50 MPa. The requirement for F100 in the equation (2) to be in the range of 1 to 60 MPa in the film's width direction means that in relation to the equation (1), the deforming stress in the film's longitudinal direction and that in the width direction should not differ significantly from each other. If the F100 value in the width direction is larger than 60 MPa, the formability of the film during a fabrication process will be poor only in the width direction, and the resulting film will not serve properly as formed parts. If the F100 value in the width direction is less than 1 MPa, on the other hand, shrinkage in the width can occur during the deposition process or the preheat process for processing, making it impossible to achieve uniform forming and appearance. To ensure a good balance among the handleability, formability and film physical properties, the F100 value in the width direction should preferably be in the range of 3 to 40 MPa, more preferably 5 to 30 MPa. In addition, a F100 value in the width direction in the range of 5 to 25 MPa is particularly preferred from the viewpoint of easy forming.

The stress at 100% elongation (F100 value) of the film at 150° C. and 200° C. are described below. A film sample cut out into a rectangular shape is preheated for 90 seconds in a constant-temperature bath adjusted to 150° C. or 200° C. and then tensile test is performed at a strain rate of 300 mm/min to determine the stress at 100% elongation. The expression "at 150° C. and 200° C." means that both measurements taken at the two temperatures meet the equations 1 and 2. Normally, the stress at 100% elongation decreases with an increasing measuring temperature. For both the equations 1 and 2 to be met at both 150° C. and 200° C., the deforming stress should be sufficiently lower at 150° C. and in addition, that stress level should be maintained up to 200° C. It is difficult to maintain a uniform film temperature in a processing apparatus where the film is subjected to a preheat process using an infrared rays heater etc., and then to a subsequent thermoforming process for vacuum forming, air-pressure forming, plug assisted forming, etc. Thus, the equations 1 and 2 should be met at both 150° C. and 200° C. to prevent local deformation from being caused by high-temperature spots, etc.

As a means of controlling the stress at 100% elongation in the polyester film so that the film can meet the equations 1 and 2 at 150° C. and 200° C., the film should preferably be drawn 2.5 to 3.5 times in the longitudinal direction and the width direction at a temperature of 90 to 130° C. The two-dimensional ratio (longitudinal direction stretch ratio x width direction stretch ratio) should preferably be in the range of 7 to 11. Heat-setting at 200 to 240° C. after drawing is preferred to relax the crystal orientation caused by the drawing. In addition to the preferred film production conditions, 5 to 50% by mass of the polyester resin used in the layer B should preferably be accounted for by a resin that has a glass transition temperature in the range of 0 to 60° C. If a resin that has a glass transition temperature in this range is mixed, it will be possible to ensure a low deformation stress stably at 150° C. and 200° C. Considering the formability and heat resistance, the content of the polyester resin with a glass transition temperature of 0 to 60° C. added to the layer B should more preferably be in the range of 10 to 40% by mass. The other components of the polyester resin in the layer B should preferably be have a glass transition temperature in the range of 60 to 90° C. from the viewpoint of handleability.

The biaxially oriented polyester film is may be used as material for formed parts, and therefore, it will sometimes be difficult to maintain the shape if the formed film thickness is less than 10 μm. Thus, the film thickness before forming should preferably be in the range of 15 to 250 μm. Film with a thickness larger than 250 μm will deform unevenly because the load actually exerted can be very large even if the deforming stress during thermoforming is minimized, and furthermore, the productivity will decrease because the forming process requires a long heating time. The film thickness should more preferably be in the range of 18 to 100 μm, still more preferably 20 to 50 μm.

In the laminated film, the laminate thickness in the layer A should be in the range of 0.1 to 5 μm, more preferably 1 to 4 μm, for both the layer A1 and the layer A2. The layer A1 and the layer A2 may have different laminate thicknesses, but they should preferably have the same thickness to ensure high film handleability and prevent curling. The thickness of the layer B, on the other hand, should preferably be in the range of 5 to 240 μm.

The biaxially oriented polyester film has a haze in the range of 0.1 to 5% to ensure high handleability and to allow the resulting formed parts to have good appearance and luster. The haze should more preferably be 0.2 to 4%, still more preferably 0.3 to 3%. The haze of film refers to the total of the surface haze and the internal haze. If the total haze is less than 0.1%, the film surface will be too smooth and act to prevent slipping, and flaws may be caused on the surface of the film during the film conveyance process or the wind-up process. If the haze is larger than 5%, the film looks as if it suffers white turbidity even after metal deposition. Thus, the film sometimes suffers a decrease in luster and deterioration of appearance. As a means of controlling the film haze in this preferred range, the particle content described later may be decreased to an extent that will not cause deterioration of the film's handleability. The polyester film comprises a A1/B/A2 type three-layer laminated film, and it is preferred that the thickness of the layer A is about the average diameter of the particles added, specifically about 0.1 to 1 μm, and that particles be added only to the layer A leaving the layer B free of particles. In the case of such laminated film, formed parts with a high luster degree and extremely good appearance can be produced if the internal haze is decreased while the surface haze is reduced by laminating an adhesive layer or a weathering resistant coat layer containing UV absorbent etc.

When drawn 1.4 times at 200° C. in both the longitudinal direction and the width direction, the biaxially oriented polyester film will increase in haze by 0.01 to 3% to ensure the resulting formed parts will have a high luster degree and appearance. The increase in film haze should more preferably be in the range of 0.01 to 2%, still more preferably 0.01 to 1%. If film is drawn 1.4 times in both the longitudinal direction and the width direction, it means that the two dimensional size will be about 200% of the undrawn film. Virtually no significant problems will take place in actual film fabrication cases if 200% two dimensional drawing is achieved in the forming process. For producing good formed parts, it is preferred that film does not suffer significant changes in appearance during this operation. During the forming process, changes in haze can be caused by transparency reduction due to spherulite growth at 200° C. or void formation near the added particles and crystal grain boundaries resulting from film deformation. There are no specific limitations on the means of controlling the increase in film haze in the range, useful ones include decreasing the particle content, adding a polyester resin that does not easily crystallize when heated, and adding a crystal nucleating agent to allow a large number crystallites to form in the film so that spherulites cannot grow up to a size that permits the scattering of visible light.

To ensure improvement in handleability and prevention of flaws from being caused during the forming process, the polyester film of the invention should preferably be contains particles with an average particle diameter (diameter equivalent spheres) in the range of 0.01 to 5 μm. To ensure prevention of flaws and loss of particles during the forming process, the average particle diameter should preferably be in the range of 0.05 to 4 μm, more preferably 0.1 to 3 μm. Preferred particles to be added include, for example, internal particles, inorganic particles, and organic particles. The content of such particles in the polyester film should preferably be in the range of 0.01 to 3% by mass, more preferably 0.03 to 3% by mass, still more preferably 0.05 to 2% by mass, and particularly preferably 0.05 to 1% by mass. If particles are added to a particular layer, the content of the particles in that layer should preferably be in the range of 0.01 to 3% by mass, particularly preferably 0.05 to 1% by mass.

Useful means of performing precipitation of internal particles in the polyester film include, for example, techniques proposed in Japanese Unexamined Patent Publication (Kokai) No. SHO 48-61556, Japanese Unexamined Patent Publication (Kokai) No. SHO 51-12860, Japanese Unexamined Patent Publication (Kokai) No. SHO 53-41355, and Japanese Unexamined Patent Publication (Kokai) No. SHO 54-90397. Further, other particles as described in Japanese Examined Patent Publication (Kokoku) No. SHO 55-20496 and Japanese Unexamined Patent Publication (Kokai) No. SHO 59-204617 may also be used in combination.

Useful inorganic particles to be added to the polyester film include, for example, those comprising wet type or dry type silica, colloidal silica, aluminum silicate, titanium oxide, calcium carbonate, calcium phosphate, barium sulfate, aluminum oxide, mica, kaolin, and clay, while useful organic particles include those comprising styrene, silicone, acrylic acids, methacrylic acids, polyesters, and divinyl compounds. In particular, preferred substances include inorganic ones such as wet type or dry type silica, and aluminum oxide, as well as styrene, silicone, acrylic acid, methacrylic acid, polyester, and divinylbenzene. Furthermore, two or more of these internal particles, inorganic particles and organic particles may be used in combination. As a means of decreasing the haze of the film, as described above, particles may be added during the polyester film production process only to the layer A whose thickness is controlled at about the average particle diameter while leaving the layer B free of particles.

The manufacturing method for the biaxially oriented polyester film is described in detail below. For the polyester resin film, commercially available polyethylene terephthalate resin and polybutylene terephthalate resin may be used, or they may be polymerized. Polyester resin can be polymerized as described in the Examples. If particles are to be added during the polymerization process, it is preferred that slurry containing particles dispersed in ethylene glycol be added to the polymerization reaction kettle up to a required particle concentration.

Preferred means of producing film from polyester resin are described in detail below. If two more polyester resins are to be mixed, each polyester resin material is weighed first to meet the required ratio, and then they are mixed. Subsequently, the mixture is dried in a nitrogen atmosphere or vacuum atmosphere, for example, at 150° C. for five hours, to adjust the water content on the polyester resin mixture to 50 ppm or below. After this, the polyester resin mixture is supplied to an extruder and melt-extruded. The resin drying process may be eliminated of a vent type twin screw extruder is used for the melt extrusion. Foreign matters are removed using a filter and a gear pump to ensure a constant extrusion rate. A feed block is provided at the top of the T-die to perform the lamination of the layers A1/B/A2. The material is discharged in a sheet like shape from the T-die onto a casting drum, followed by cooling for solidification to produce undrawn film. Means that may be used to ensure good contact between the sheet like polymer and the casting drum during this process include, for example, electrostatic application with a wire like electrode or a tape like electrode; providing a water layer between the casting drum and the extruded polymer sheet; and maintaining the casting drum temperature in the range between the glass transition temperature of the polyester resin and a temperature 20° C. below the glass transition temperature of the resin to allow the extruded polymer to adhere to the drum. Two or more of these means may be used in combination. Of these casting methods, electrostatic application is preferably used for polyester in order to ensure a high productivity and surface smoothness.

Then, the undrawn film is drawn in the longitudinal direction and the width direction by an appropriate means of successive biaxial stretching or simultaneous biaxial stretching. The stretch ratio should preferably be in the range of 2.5 to 3.5, more preferably 2.8 to 3.5, and particularly preferably 3 to 3.4, in each direction. The drawing rate should preferably be in the range of 1,000 to 200,000%/min. It is preferred that the drawing temperature be maintained in the range between the glass transition temperature and a temperature 50° C. above the glass transition temperature of the resin. It is more preferably that the drawing temperature be in the range of 90 to 130° C., and it is particularly preferred that the temperature of drawing in the longitudinal direction and that in the width direction be in the range of 100 to 120° C. and 90 to 110° C., respectively. Such drawing may be carried out twice or more times, but the final two dimensional stretch ratio (longitudinal direction stretch ratio×width direction stretch ratio) should preferably be in the range of 7 to 11.

It is preferred, furthermore, to perform heat treatment after the biaxial drawing. Such heat treatment may be carried out by a conventionally known means such as use of an oven and heated roll. This heat treatment is performed at temperature 120° C. or more below the melting point of the polyester material, the preferred temperature range being 200 to 240° C. The temperature should preferably be in the range of 210 to 235° C. to ensure high transparency and dimensional stability at high temperatures. There are no specific limitations on the heat treatment time as long as treatment in such temperature range will not cause deterioration in characteristics of the film, the range preferably being 1 to 60 seconds, and more preferably 1 to 30 seconds. Furthermore, the heat treatment may be performed with the film relaxed in the longitudinal direction and/or width direction. In addition, corona treatment may be performed or a coat layer may be provided at least on one surface to ensure good adhesion with the ink-printed layer, adhesive layer, or metal-deposited layer.

As a preferred means of providing a coat layer by in-line coating during the film production, the film is subjected at least to uniaxially drawing, and a coating composition dispersed in water is applied uniformly over the film with a metering bar or a rotogravure roll, followed by simultaneous drawing of the film and drying the coating material. For this process, the coating layer thickness should preferably be in the range of 0.01 to 0.5 μm.

The metallic laminated film is required to have a metal layer at least on one surface. The existence of the metal layer allows the film to have a metallic appearance and therefore serves as a substitute for conventional formed parts made of plated resin.

There are no specific limitations on the metal to be used, but useful metals include, for example, indium (melting point: 156° C.), tin (melting point: 228° C.), aluminum (melting point: 660° C.), silver (melting point: 961° C.), copper (melting point: 1083° C.), zinc (melting point: 420° C.), nickel (melting point: 1453° C.), chrome (1857° C.), titanium (1725° C.), platinum (melting point: 1772° C.), palladium (melting point: 1552° C.), and their alloys. The use of a metal with a melting point of 150 to 400° C. is preferred because forming of the resulting metal layer can also be performed in the temperature range where the polyester film can be formed, facilitating the prevention of defects in the deposited layer during forming. In particular, the use of indium and/or tin is preferred to ensure high formability and good metal luster, indium being particularly preferred.

There are no specific limitations on the means of producing the metal layer, but useful ones include vacuum deposition, electron-beam deposition, sputtering, and ion plating. Sputtering is preferred to ensure uniform film surface and good adhesion between the metal layer and the film. It is also preferred because a metal layer produced by sputtering can maintain the target's composition nearly perfectly.

The thickness of the metal layer should preferably be in the range of 1 to 500 nm, more preferably 3 to 300 nm. To ensure a high productivity, furthermore, the thickness of the metal layer should preferably be in the range of 3 to 200 nm.

In the metallic laminated film, the adhesion between the film and the metal layer is required to be 3.5 N/10 mm or more. If the adhesion between the film and the metal layer is less than 3.5 N/10 mm, the metal layer will not be closely unified with the film during the thermoforming process, and cracks will be produced in the metal layer to result in a rough surface, leading to a poor appearance with a reduced transparency. Thus, such a weak adhesion is not preferred. Formability is particularly important in the metallic laminated film, and a strong adhesion is required between the film and the metal layer to resist the forming conditions during the thermoforming the film into formed parts.

Evaluation methods for the adhesion between the film and the metal layer are described below. A film sample of 30 mm width×150 mm length is cut out and an adhesive is applied over the metal layer surface which is adhered to an acrylic plate. Cut lines are produced in the resulting sample plate at intervals of 10 mm width, and 180° peel test is performed at a rate of 300 mm/min. The peel strength determined is used as the adhesion between the film and the metal layer. The adhesion between the film and the metal layer should more preferably be 5 N/10 mm or more, still more preferably 6 N/10 mm or more, to ensure a good appearance after thermoforming. To allow the adhesion between the film and the metal layer to be 3.5 N/10 mm or more, the film's surface should preferably be pretreated in advance. There are no specific limitations on the method for the pretreatment, and useful methods include corona discharge, plasma treatment, and application of an anchor coating agent, of which plasma treatment is preferred to ensure a good adhesion and appearance.

There are no specific limitations on the method for the plasma treatment, but a useful method is as follows: the base to be treated is placed in an internal electrode type electric discharge apparatus containing a drum like electrode and a counter electrode that consists of several rod-like electrode elements, and electric discharge is caused by applying a high voltage direct current or alternating current between the electrodes to generate plasma of the gas for treatment, to which the surface of the base is exposed for treatment. Required conditions for plasma treatment depend on the type of the gas for treatment, gas flow rate, electric source, and electric power, and optimum conditions are assumed for the required treatment.

There are no specific limitations on the treatment gas, but useful gases include Ar, $N_2$, He, $CO_2$, CO, air, water vapor, and $O_2$, which may be used singly or as a mixture. In particular, $N_2$ and $O_2$ are preferred to ensure good adhesion.

The gas flow rate should preferably be in the range of 1 to 800 sccm. The range should more preferably be 5 to 600 sccm, still more preferably 10 to 500 sccm, to ensure stable plasma treatment and good adhesion.

Useful electrode materials include NiCr and Ti, but NiCr is preferred to ensure good adhesion.

The electric power should preferably be in the range of 0.5 kW to 7 kW to ensure increased adhesion between the film and the metal. Sufficient adhesion will not be achieved between the film and the metal if the electric power is less than 0.5 kW while the film surface will suffer a poor appearance if the electric power is larger than 7 kW.

In the metallic laminated film, the center line average roughness of the metal layer surface should preferably be in the range of 1 to 40 nm. The center line average roughness is calculated from two dimensional line roughness measures at selected points with a laser microscope. If the center line average roughness is less than 1 nm, the biaxially oriented polyester film should have a center line average roughness less than 1 nm. The handleability of the polyester film will deteriorate, and the surface will suffer flaws as a result of abrasion between film sheets, leading to a poor appearance. If it is more than 40 nm, the metal layer after thermoforming will have a more seriously rough surface, and suffer reduced transparency and decreased metal luster.

For the metal layer surface to have a center line average roughness in the range, it is preferred that the biaxially oriented polyester film itself has a lower center line average roughness. Specifically, it will be effective if the metal layer surface of the biaxially oriented polyester film has a center line average roughness in the range of 1 nm to 30 nm. For the biaxially oriented polyester film to have a surface roughness in the range of 1 nm to 30 nm, the particle content is decreased or the particle diameter is decreased to an extent that does not lead to deterioration in the handleability of the biaxially oriented polyester film. It is particularly preferred that the average particle diameter (diameter of equivalent sphere) of the particles to be added should preferably be in the range of 0.01 to 1.5 µm, more preferably 0.01 to 1.3 µm. The average particle diameter (diameter of equivalent sphere) of the particles is determined from a cross section of the film observed with a scanning electron microscope at a magnification of about 10000 to 100000. An image analyzer is used to examine observed images. An appropriate number of particles are observed at several points. Based on the image analysis, the diameter of equivalent sphere is determined from the particles at points accounting for 50% by volume. The diameter of equivalent sphere refers to the diameter of a sphere that has the same volume of the particle. Production of a uniform metal layer is extremely important for the biaxially oriented polyester film to have strong adhesion with the metal layer. For production of a uniform metal layer, sputtering is effective for metal layer production, and the center line average roughness of the metal layer should more preferably be in the range of 2 to 35 nm, still more preferably 3 to 30 nm.

The non-metal layer surface of the metallic laminated film should preferably have a luster degree in the range of 400 to 900. The luster degree is defined as the 60-degree specular luster that is measured according to JIS Z-8741 (1997). The non-metal layer surface refers to the surface opposite to the one with the metal layer. When the metallic laminated film is used in formed parts, the non-metal layer surface constitutes the outside surface of the formed parts, and therefore, the formed articles will have a good metallic appearance if the non-metal layer surface has a high luster degree. If the luster degree is less than 400, the formed parts will fail to have a good metallic appearance, possibly leading to poor aesthetic properties. If the luster degree is more than 900, large deterioration in metal luster can be caused in some cases during the forming process. Adjustment of the haze of the biaxially oriented polyester film is an effective means of maintaining the luster degree in said range. The luster degree tends to decrease as the film's haze increases. Specifically, the haze of the biaxially oriented polyester film should preferably be in the range of 0.1 to 5%. The luster degree tends to deteriorate with an increasing number of defects in the surface of the biaxially oriented polyester film or defects in the metal layer surface. Therefore, it is very important to decrease the amount of streak-like undulations and foreign matters in the surface of the biaxially oriented polyester film, and to produce a uniform metal layer. The luster degree should more preferably be in the range of 450 to 850, still more preferably 500 to 800.

The biaxially oriented polyester film and the metallic laminated film should preferably have a weathering resistant resin layer at least on one side to ensure that high quality is maintained when used in an outdoor environment. Useful means of producing the weathering resistant resin layer include the above-mentioned in-line coating during the film production process, off-line coating with weathering resistant resin, and laminating with a weathering resistant resin sheet obtained elsewhere. If a weathering resistant resin layer with a thickness of 1 µm or more is needed, it is preferred from the view point of production that off-line coating be performed or that a weathering resistant resin sheet is laminated. There are no specific limitations on the resin to be used to produce the weathering resistant resin layer, but preferred resins include polymethylmethacrylate and polyurethane. Polyurethane is particularly preferred. In the case of film with a thin metal layer, the weathering resistant resin layer should preferably be provided on the film surface opposite to the thin metal layer.

The biaxially oriented polyester film has high formability, serves for easy production of formed parts that closely meet the shape of the die during the thermoforming process such as vacuum forming and air-pressure forming and, if metal-deposited in advance before the forming process, serves to provide formed parts with a plated metal-like appearance that can be used preferably as components of automobiles, electric appliances, etc.

EXAMPLES

Our films and methods are described in detail below with reference to Examples. The properties were measured and evaluated by the methods describe below.

(1) Melting Point

A differential scanning calorimeter (RDC220 manufactured by Seiko Instruments Inc.) was used for measurement. A 5 mg piece of film was used as sample, and the melting point was determined as the temperature at the endoergic peak observed when the sample was heated from 25° C. to 300° C. at a rate of 20° C./min. If more than one endoergic peak was observed, the temperature at the endoergic peak that appeared at the highest temperature was taken as the melting point.

(2) Stress at 100% Elongation

A rectangular sample of 150 mm length×10 mm width in the longitudinal direction and the width direction was cut out from the film. A tensile testing machine (Tensilon UCT-100 manufactured by Orientec Co., Ltd.) was used, and tensile test was carried out in the film's longitudinal direction and width direction under the conditions of an initial chuck-to-chuck distance of 50 mm and a tension speed of 300 mm/min. For tensile test to take measurements, the film sample was placed in a constant temperature bath adjusted to 150° C. or 200° C. and preheating was performed for 90 seconds. The load on the film was measured when the sample reached a 100% elongation (chuck-to-chuck distance was 100 mm), and the measured load divided by the cross section of the sample before the test (film thickness×10 mm) was determined to provide the stress at 100% elongation (F100 value). Five measurements were taken for a sample in each direction, and their average was used for evaluation.

(3) Film Haze

A haze meter (HGM-2GP manufactured by Suga Test Instruments Co., Ltd.) was used according to JIS K 7105 (1985) to measure the haze. Measurement was performed for a film sample put in a glass cell for liquid test filled with tetralin in order to determine the internal haze free of effect of the surface haze. The surface haze was calculated by subtracting the internal haze from the total haze that was measured without using tetralin. Measurements were taken at appropriately selected three points and their average was used.

(4) Dimensional Stability at High Temperatures

A rectangular sample of 150 mm length×10 mm width in the longitudinal direction and the width direction was cut out from the film. Reference lines were drawn on the sample at intervals of 100 mm, and a weight of 3 g was hung. The sample loaded was left for 30 minutes in a hot-air oven heated at 150° C. to perform heat treatment. After the heat treatment, the distance between the reference lines was measured, and the heat shrinkage rate was calculated from the change in the distance between the reference lines caused by the heat treatment. The shrinkage rate was assumed to indicate the dimensional stability at high temperatures. Here, five measurements were taken for a sample in each direction, and their average was used for evaluation.

(5) Haze after 200° C. Forming Process

A film sample of 90 mm length×90 mm width in the longitudinal direction and the width direction was cut out and placed in a film stretcher (manufactured by Toyo Seiki Seisaku-sho, Ltd.) heated at 200° C. After preheating for 10 seconds, the sample was deformed by simultaneous biaxial stretching at a rate of 5000%/min up to a stretch ratio of 1.4 in both directions. For the deformed film sample, the film haze was measured by the same procedure as described in paragraph (3), and compared with the haze measured before drawing.

(6) Composition of Polyester Material

A resin sample or a film sample was dissolved in hexafluoroisopropanol (HFIP) or a mixed solvent of HFIP and chloroform, and 1H-NMR and 13C-NMR were used to determine the content of each residue.

(7) Intrinsic Viscosity

For the intrinsic viscosity of polyester resin and film, polyester was dissolved in ortho-chlorophenol, and measurement was performed at 25° C. using an Ostwald viscometer.

(8) Thermoformability

Indium was sputtered over one side of a film sample up to a thickness of 100 nm to form a metal layer. A far infrared ray heater of 300° C. was used to heat the metal layer laminated film until the surface temperature reached 200° C., and vacuum forming was performed in a cylindrical die (bottom face diameter 50 mm) to produce film. The state of the product formed to meet the shape of the die was evaluated based on the degree of forming (drawing ratio: forming height/bottom face diameter) according to the criteria described below:

Class A: Can be formed at a drawing ratio of 0.7 or more.
Class B: Can be formed at a drawing ratio of 0.7-0.3.
Class C: Cannot be formed at a drawing ratio of 0.3.

(9) Uniform Formability

As in the above-mentioned case, a far infrared ray heater of 350° C. was used to heat an indium layer laminated film until the surface temperature reached 180° C., and vacuum forming was performed in a cylindrical die (a combination of 25 small dies, arranged in 5×5 arrays at intervals of 30 mm, with a drawing ratio of 0.5 and die's bottom face diameter of 50 mm) to produce film. The state of the product formed to meet the shape of the die was examined by visual observation and evaluated according to the criteria described below:

Class A: All of the 25 products formed uniformly.
Class B: 24 to 20 products formed to shape of die.
Class C: Only 19 or less products formed to shape of die.

(10) Aesthetic Properties

The indium layer laminated film was observed visually from the non-metal layer side, and evaluated according to the criteria described below:

Class A: Very high brightness, and beautiful metallic layer observed.
Class B: Slightly low brightness, and metallic layer observed.
Class C: Low brightness, and poor metallic layer observed.

(Production of Polyester)

The polyester resins used for the film production were prepared as described below.

(Polyester A)

0.09 parts by mass of magnesium acetate and 0.03 parts by mass of antimony trioxide were added to a mixture of 100 parts by mass of dimethyl terephthalate and 70 parts by mass of ethylene glycol, and heated gradually up to 220° C., where ester exchange reaction was performed while distilling methanol. Subsequently, 0.020 parts by mass of a 85% aqueous phosphoric acid solution was added to the ester exchange reaction product, which was then transferred to a polycondensation reaction kettle. While heating the polymerization kettle, the pressure in the reacting system was reduced gradually down to 1 hPa. Polycondensation reaction was continued at 290° C. under the reduced pressure to produce a polyethylene terephthalate resin with an intrinsic viscosity of 0.65. The resin, which is hereafter referred to as polyester A, was actually a copolymer comprising 2 mol % diethylene glycol which resulted as a by-product of the reaction.

(Particle Master)

During the process of producing the polyester A, ethylene glycol slurry containing aggregated silica particles with an average particle diameter of 2.4 μm was add after the ester exchange reaction, and then polycondensation reaction was carried out to provide a particle master in which particles accounted for 2% by mass of the polymer.

(Polyester B)

A mixture of 100 parts by mass of terephthalic acid and 110 parts by mass of 1,4-butanediol was heated in a nitrogen atmosphere up to 140° C. to produce a uniform solution, and then 0.054 parts by mass of tetra-n-butyl ortotitanate and 0.054 parts by mass of monohydroxybutyltin oxide were added, followed by esterification. Subsequently, 0.066 parts by mass of tetra-n-butyl ortotitanate was added, and polycondensation reaction was carried out under reduced pressure to produce a polybutylene terephthalate resin with an intrinsic viscosity of 0.88. Crystallization was then performed in a nitrogen atmosphere at 140° C., followed by solid phase polymerization for six hours in a nitrogen atmosphere at 200° C. to produce a polybutylene terephthalate resin with an intrinsic viscosity of 1.22, which is hereafter referred to as polyester B.

(Polyester C)

Polymerization was performed by the same procedure as for the polyester A except that 95 parts by mass of dimethyl terephthalate and 5 parts by mass of dimethyl isophthalate were used instead of 100 parts by mass of dimethyl terephthalate, which was used for the polymerization of the polyester A, to produce a polyethylene terephthalate resin containing 5 mol % isophthalic acid as copolymer component (melting point 246° C., diethylene glycol copolymerization rate 1.8 mol %), which is hereafter referred to as polyester C.

(Polyester D)

0.08 parts by mass of magnesium acetate and 0.022 parts by mass of antimony trioxide were added to a mixture of 80 parts by mass of dimethyl terephthalate, 20 parts by mass of dimethyl isophthalate, and 67 parts by mass of ethylene glycol, and heated gradually up to 220° C., where ester exchange reaction was performed while distilling methanol. Then, 0.019 parts by mass of 85% aqueous phosphoric acid solution and ethylene glycol slurry were added so that aggregated silica particles with an average particle diameter 0.8 μm would accounted for 0.06% by mass in the resulting resin. The temperature was gradually raised to 280° C. and the pressure was gradually reduced to 1 hPa, followed by polycondensation to provide a resin with an intrinsic viscosity of 0.7. Then the resin was discharged into strands, which were cooled and cut to provide a particle-containing polyethylene terephthalate resin which comprised 20 mol % isophthalic acid as copolymer component (diethylene glycol by-product copolymerization rate 2.4 mol %), which is hereafter referred to as polyester D.

(Polyester E)

0.04 parts by mass of manganese acetate was added to a mixture of 100 parts by mass of dimethyl terephthalate, 70 parts by mass of ethylene glycol, and 7 parts by mass of 1,4-cyclohexanedimethanol, and heated gradually up to 220° C., where ester exchange reaction was performed while distilling methanol. Subsequently, 0.045 parts by mass of a 85% aqueous phosphoric acid solution and 0.01 parts by mass of germanium dioxide were added, and the temperature was raised gradually to 275° C. and the pressure was reduced gradually to 1 hPa, followed by polycondensation to provide a resin with an intrinsic viscosity of 0.67. Then the resin was discharged into strands, which were cooled and cut to provide a polyethylene terephthalate resin comprising 4 mol % 1,4-cyclohexanedimethanol as copolymer component. A cube of side 3 mm was cut out from the polymer, and subjected to solid phase polymerization in a rotary type vacuum polymerizer at 225° C. under a reduced pressure of 1 hPa to provide a resin with an intrinsic viscosity of 0.8, which is hereafter referred to as polyester E.

(Polyester F)

Polymerization was performed by the same procedure as for the polyester B except that 90 parts by mass of terephthalic acid and 10 parts by mass of isophthalic acid were used instead of 100 parts by mass of terephthalic acid, which was used for the polymerization of the polyester B, to produce a polybutylene terephthalate resin containing 10 mol % isophthalic acid as copolymer component (melting point 210° C.), which is hereafter referred to as polyester F.

(Polyester G)

0.08 parts by mass of magnesium acetate and 0.022 parts by mass of antimony trioxide were added to a mixture of 88 parts by mass of dimethyl terephthalate, 12 parts by mass of dimethyl isophthalate, 67 parts by mass of ethylene glycol, and heated gradually up to 220° C., where ester exchange reaction was performed while distilling methanol. Then, 0.019 parts by mass of 85% aqueous phosphoric acid solution and ethylene glycol slurry were added so that aggregated silica particles with an average particle diameter 1.5 μm would accounted for 0.01% by mass and perfect sphere particles with an average particle diameter 0.1 μm would accounted for 0.02% by mass in the resulting resin. The temperature was raised gradually to 280° C. and the pressure was reduced gradually to 1 hPa, followed by polycondensation to provide a resin with an intrinsic viscosity of 0.7. Then the resin was discharged into strands, which were cooled and cut to provide a polyethylene terephthalate resin containing 12 mol % isophthalic acid as copolymer component (diethylene glycol by-product copolymerization rate 2.2 mol %), which is hereafter referred to as polyester G.

(Polyester H)

A mixture of 100 parts by mass of terephthalic acid and 110 parts by mass of 1,4-butanediol was heated up to 140° C. in a nitrogen atmosphere to produce a uniform solution, and then 0.054 parts by mass of tetra-n-butyl ortotitanate and 0.054 parts by mass of monohydroxybutyltin oxide were added, followed by esterification. Then, 0.066 parts by mass of tetra-n-butyl ortotitanate was added, and subjected polycondensation reaction under a reduced pressure to produce a polybutylene terephthalate resin with an intrinsic viscosity of 0.92, which is hereafter referred to as polyester H.

(Polyester J)

0.04 parts by mass of manganese acetate was added to a mixture of 100 parts by mass of dimethyl terephthalate, 65 parts by mass of ethylene glycol, and 13 parts by mass of 1,4-cyclohexanedimethanol, and heated gradually up to 220° C., where ester exchange reaction was performed while distilling methanol. Subsequently, 0.045 parts by mass of a 85% aqueous phosphoric acid solution and 0.01 parts by mass of germanium dioxide were added, and the temperature was raised gradually to 275° C. and the pressure was reduced gradually to and 1 hPa, followed by polycondensation to provide a resin with an intrinsic viscosity of 0.6. Then the resin was discharged into strands, which were cooled and cut to produce a polyethylene terephthalate resin containing 8 mol % 1,4-cyclohexanedimethanol as copolymer component. A cube of side 3 mm was cut out from the polymer, and subjected to solid phase polymerization in a rotary type vacuum polymerizer at 225° C. under a reduced pressure of 1 hPa to provide a resin with an intrinsic viscosity of 0.8, which is hereafter referred to as polyester J.

Table 1 lists the polyester resin prepared above.

TABLE 1

| | Glycol component (mol %) | | | Acid component (mol %) | | Intrinsic viscosity | Melting point (° C.) | Remarks |
|---|---|---|---|---|---|---|---|---|
| | EG | BD | Others | TPA | others | | | |
| Polyester A | 98 | 0 | DEG 2.0 | 100 | 0 | 0.65 | 255 | |
| Polyester B | 0 | 100 | 0 | 100 | 0 | 1.22 | 226 | |
| Polyester C | 98.2 | 0 | DEG 1.8 | 95 | IPA 5 | 0.68 | 246 | |
| Polyester D | 97.6 | 0 | DEG 2.4 | 80 | IPA 20 | 0.72 | 210 | 0.8 μm aggregated silica particle 0.06% by mass |
| Polyester E | 94 | 0 | CHDM 4 DEG 2.0 | 100 | 0 | 0.84 | 240 | |
| Polyester F | 0 | 100 | 0 | 90 | IPA 10 | 0.85 | 210 | |
| Polyester G | 97.8 | 0 | DEG 2.2 | 88 | IPA 12 | 0.7 | 228 | 1.5 μm aggregated silica particle 0.01% by mass 0.1 μm perfect sphere silica particle 0.02% by mass |
| Polyester H | 0 | 100 | 0 | 100 | 0 | 0.92 | 225 | |
| Polyester J | 90 | 0 | CHDM 8 DEG 2.0 | 100 | 0 | 0.8 | 225 | |
| Particle master | 98 | 0 | DEG 2.0 | 100 | 0 | 0.63 | | 2.4 μm aggregated silica particle 2.0% by mass |

The abbreviations used in the Table are as described below:
EG: ethylene glycol residue
BD: 1,4-butanediol residue
TPA: terephthalic acid residue
DEG: diethylene glycol residue
CHDM: 1,4-cyclohexanedimethanol residue
IPA: isophthalic acid residue
PG: 1,3-propanediol residue

Example 1

A mixture of the polyester A, polyester E and particle master in the ratio of 77.5:20:2.5 by mass was used as the polyester resin for the layer A. A mixture of the polyester A, polyester B and polyester E in the ratio of 60:20:20 by mass was used as the polyester resin for the layer B. Each of the polyester resin mixtures was dried in a vacuum dryer at 150° C. for five hours to remove water completely, fed to a separate single screw extruder, and melted at 275° C. The molten resin mixtures were combined in a feed block provided at the top of the T-die to produce an A/B/A type laminate with a thickness ratio of 2:21:2, which was directly discharged from the T-die onto a cooling drum adjusted to 20° C. to produce a sheet. During this process, a wire-like electrode with a diameter of 0.1 mm was used to apply static electricity to ensure close contact with the drum, and an undrawn film was obtained. Subsequently, the undrawn film was heated on a heating roller, and at a film temperature 97° C., drawn 3.2 times in the longitudinal direction. Then, the film was drawn 3.1 times in the width direction in a tenter type transverse drawing machine under the conditions of a preheat temperature of 70° C. and a drawing temperature of 100° C. In the tenter, the film was heat treated for 2 seconds at 230° C. while being relaxed 5% in the width direction, to provide a biaxially oriented film with a thickness of 25 µm.

Example 2

A mixture of the polyester A, and particle master in the ratio of 98:2 by mass was used as the polyester resin for the layer A. A mixture of the polyester B and polyester C in the ratio of 15:85 by mass was used as the polyester resin for the layer B. Each of the polyester resin mixtures was dried in a vacuum dryer at 150° C. for five hours to remove water completely. Each layer was then fed to a separate single screw extruder, and the layers A and B were melted at 280° C. and 270° C., respectively. They were combined in a feed block that was provided at the top of the T-die and adjusted to 275° C. to produce an A/B/A type laminate with a thickness ratio of 1:18:1, which was directly discharged from the T-die onto a cooling drum adjusted to 20° C. to produce a sheet. During this process, a wire-like electrode with a diameter of 0.1 mm was used to apply static electricity to ensure close contact with the drum, and an undrawn film was obtained. Subsequently, the undrawn film was heated on a heating roller, and at a film temperature 93° C., drawn 3.3 times in the longitudinal direction. Then, the film was drawn 3.2 times in the width direction in a tenter type transverse drawing machine under the conditions of a preheat temperature of 70° C. and a drawing temperature of 95° C. In the tenter, the film was heat treated for 2 seconds at 220° C. while being relaxed 5% in the width direction, to provide a biaxially oriented film with a thickness of 20 µm.

Example 3

A mixture of the polyester A, polyester F and particle master in the ratio of 88:10:2 by mass was used as the polyester resin for the layer A. A mixture of the polyester A and polyester F in the ratio of 70:30 by mass was used as the polyester resin for the layer B. Each of the polyester resin mixtures was dried in a vacuum dryer at 150° C. for five hours to remove water completely. Each layer was then fed to a separate single screw extruder, and melted at 270° C. They were combined in a feed block provided at the top of the T-die to produce a laminate with a laminating ratio of 3:19:3, which was directly discharged from the T-die onto a cooling drum adjusted to 25° C. to produce a sheet. During this process, a wire-like electrode with a diameter of 0.1 mm was used to apply static electricity to ensure close contact with the drum, and an undrawn film was obtained. Subsequently, undrawn film was heated on a heating roller, and at a film temperature 95° C., drawn 3.2 times in the longitudinal direction. Then, the film was drawn 3.1 times in the width direction in a tenter type transverse drawing machine under the conditions of a preheat temperature of 70° C. and a drawing temperature of 90° C. In the tenter, the film was heat treated for 2 seconds at 230° C. while being relaxed 5% in the width direction, to provide a biaxially oriented film with a thickness of 25 µm.

Example 4

A mixture of the polyester A and polyester B in the ratio of 70:30 by mass was used as the polyester resin for the polyester resin that constitutes the layer B. A mixture of the polyester A, polyester B and particle master in the ratio of 87:10:3 by mass was used as the polyester resin that constitutes the layer A1. A mixture of the polyester A, polyester B and particle master in the ratio of 92:5:3 by mass was used as the layer A2. Each of the polyester resin mixtures was dried in a vacuum dryer at 160° C. for four hours, fed to a separate single screw extruder, and melted at 275° C. Each of them was fed to a filter and gear pump through a separate pipe to remove foreign matters and to ensure a constant extrusion rate. They were combined in a feed block provided at the top of the T-die to produce an A1/B/A2 type laminate (with a thickness ratio of 2:20:3), which was directly discharged from the T-die onto a cooling drum adjusted to 25° C. to produce a sheet. During this process, a wire-like electrode with a diameter of 0.1 mm was used to apply static electricity to ensure close contact with the drum, and an undrawn film was obtained. Subsequently, the undrawn film was heated on a heating roller, and at a film temperature 96° C., drawn 3.2 times in the longitudinal direction, immediately followed by cooling on a metal roll adjusted to 40° C. Then, the film was drawn 3.2 times in the width direction in a tenter type transverse drawing machine under the conditions of a preheat temperature of 75° C. and a drawing temperature of 95° C. In the tenter, the film was heat treated for 2 seconds at 230° C. while being relaxed 4% in the width direction, to provide a biaxially oriented film with a thickness of 25 µm. The metal sputtering for the evaluation was performed on the A1-side surface.

Comparative Example 1

A mixture of the polyester A, polyester B and particle master in the ratio of 76:20:4 by mass was used as the polyester resin. The polyester resin mixture was dried in a vacuum dryer at 150° C. for five hours to remove water completely, and fed to a single screw extruder, and melted at 275° C. It was discharged from the T-die onto a cooling drum adjusted to 20° C. to produce a sheet. During this process, a wire-like electrode with a diameter of 0.1 mm was used to apply static electricity to ensure close contact with the drum, and an undrawn film was obtained. Subsequently, the undrawn film was heated on a heating roller, and at a film temperature 90° C., drawn 3.2 times in the longitudinal direction. Then, the film was drawn 3.1 times in the width direction in a tenter type transverse drawing machine under the conditions of a preheat temperature of 90° C. and a drawing temperature of 110° C. In the tenter, the film was heat treated for 2 seconds at 210° C. while being relaxed 5% in the width direction, to provide a biaxially oriented film with a thickness of 25 μm.

Comparative Example 2

A mixture of the polyester B, polyester D and particle master in the ratio of 60:39:1 by mass was used as the polyester resin. The polyester resin mixtures was dried in a vacuum dryer at 150° C. for five hours to remove water completely, and fed to a single screw extruder, and melted at 270° C. It was discharged from the T-die onto a cooling drum adjusted to 20° C. to produce a sheet. During this process, a wire-like electrode with a diameter of 0.1 mm was used to apply static electricity to ensure close contact with the drum, and an undrawn film was obtained. Subsequently, the undrawn film was heated on a heating roller, and at a film temperature 70° C., drawn 3.5 times in the longitudinal direction. Then, the film was drawn 3.5 times in the width direction in a tenter type transverse drawing machine under the conditions of a preheat temperature of 80° C. and a drawing temperature of 105° C. In the tenter, the film was heat treated for 2 seconds at 210° C. while being relaxed 5% in the width direction, to provide a biaxially oriented film with a thickness of 25 μm.

Comparative Example 3

The polyester D was used as the polyester resin. The polyester D was dried in a vacuum dryer at 180° C. for three hours to remove water completely, fed to a single screw extruder, and melted at 280° C. It was discharged from the T-die onto a cooling drum adjusted to 25° C. to produce a sheet. During this process, a wire-like electrode with a diameter of 0.1 mm was used to apply static electricity to ensure close contact with the drum, and an undrawn film was obtained. Subsequently, the undrawn film was heated on a heating roller, and at a film temperature 90° C., drawn 3.2 times in the longitudinal direction. Then, the film was drawn 3.2 times in the width direction in a tenter type transverse drawing machine under the conditions of a preheat temperature of 90° C. and a drawing temperature of 110° C. In the tenter, the film was heat treated for 2 seconds at 210° C. while being relaxed 3% in the width direction, to provide a biaxially oriented film with a thickness of 25 μm.

Comparative Example 4

A mixture of the polyester G and polyester H in the ratio of 55:45 by mass was used as the polyester resin. The polyester resin mixtures was dried in a vacuum dryer at 150° C. for five hours to remove water completely, fed to a separate single screw extruder, and melted at 270° C. It was discharged from the T-die onto a cooling drum adjusted to 20° C. to produce a sheet. During this process, a wire-like electrode with a diameter of 0.1 mm was used to apply static electricity to ensure close contact with the drum, and an undrawn film was obtained. Subsequently, the undrawn film was heated on a heating roller, and at a film temperature 70° C., drawn 3.0 times in the longitudinal direction. Then, the film was drawn 3.2 times in the width direction in a tenter type transverse drawing machine under the conditions of a preheat temperature of 75° C. and a drawing temperature of 95° C. In the tenter, the film was heat treated for 2 seconds at 190° C. while being relaxed 3% in the width direction, to provide a biaxially oriented film with a thickness of 50 μm.

Comparative Example 5

A mixture of the polyester A, polyester B, polyester E and particle master in the ratio of 57.5:20:20:2.5 by mass was used as the polyester resin. The polyester resin mixtures was dried in a vacuum dryer at 150° C. for five hours to remove water completely, fed to a separate single screw extruder, and melted at 275° C. The resin was directly discharged from the T-die onto a cooling drum adjusted to 20° C. to produce a sheet. During this process, a wire-like electrode with a diameter of 0.1 mm was used to apply static electricity to ensure close contact with the drum, and an undrawn film was obtained. Subsequently, the undrawn film was heated on a heating roller, and at a film temperature 97° C., drawn 3.2 times in the longitudinal direction. Then, the film was drawn 3.1 times in the width direction in a tenter type transverse drawing machine under the conditions of a preheat temperature of 70° C. and a drawing temperature of 100° C. In the tenter, the film was heat treated for 2 seconds at 230° C. while being relaxed 5% in the width direction, to provide a biaxially oriented film with a thickness of 25 μm.

Comparative Example 6

A two-layer laminated film consisting of a layer A and a layer B was produced. A mixture of the polyester A, polyester B and particle master in the ratio of 69:30:1 by mass was used as the polyester resin that constituted the layer A. A mixture of the polyester A, polyester B and particle master in the ratio of 87:10:3 by mass was used as the polyester resin for the layer B. Each of the polyester resin mixtures was dried in a vacuum dryer at 160° C. for four hours, fed to a separate single screw extruder, and melted at 275° C. Each of them was fed to a filter and gear pump through a separate pipe to remove foreign matters and to ensure a constant extrusion rate. They were combined in a feed block provided at the top of the T-die to produce an A/B laminate (with a thickness ratio of 22:3), which was discharged from the T-die onto a cooling drum adjusted to 25° C. to produce a sheet. During this process, a wire-like electrode with a diameter of 0.1 mm was used to apply static electricity to ensure close contact with the drum, and an undrawn film was obtained.

Subsequently, the undrawn film was heated on a heating roller, and at a film temperature of 96° C., drawn 3.2 times in the longitudinal direction, immediately followed by cooling on a metal roll adjusted to 40° C. Then, the film was drawn 3.2 times in the width direction in a tenter type transverse drawing machine under the conditions of a preheat temperature of 75° C. and a drawing temperature of 95° C. In the tenter, the film was heat treated for 2 seconds at 230° C. while being relaxed 4% in the width direction, to provide a biaxially oriented film with a thickness of 25 μm.

TABLE 2

|  | Example 1 | Example 2 | Example 3 |
|---|---|---|---|
| Layer A resin mixing ratio (% by mass) | polyester A 77.5% polyester E 20% particle master 2.5% | polyester A 98% particle master 2% | polyester A 88% polyester F 10% particle master 2% |
| Layer B resin mixing ratio (% by mass) | polyester A 60% polyester B 20% polyester E 20% | polyester B 15% polyester C 85% | polyester A 68% polyester F 30% |
| Layer B composition — Glycol component | EG 79.5 mol % BD 18.0 mol % others 2.5 mol % | EG 85.0 mol % BD 13.4 mol % others 1.6 mol % | EG 71.2 mol % BD 27.3 mol % others 1.5 mol % |
| Layer B composition — Acid component | TPA 100 mol % others 0 mol % | TPA 95.8 mol % others 4.2 mol % | TPA 97.3 mol % others 2.7 mol % |
| Film thickness (μm) | 25 | 20 | 25 |
| Laminate composition | A/B/A | A/B/A | A/B/A |
| Layer thickness ratio | 2:21:2 | 1:18:1 | 3:19:3 |
| Film's melting point (° C.) | 248 | 246 | 251 |
| $F_{100}$ (MPa) 150° C. | 32/44 | 37/59 | 36/56 |
| MD/TD 200° C. | 18/20 | 28/40 | 22/33 |
| Heat shrinkage MD/TD (%) | 0.8/0.1 | 1.6/0.5 | 0.5/0.0 |
| Film haze (%) | 4.1 | 3.8 | 3.6 |
| Haze after forming (%) | 4.7 | 7.6 | 4.4 |
| Increase in haze by forming | 0.6 | 3.8 | 0.8 |
| Thermoformability | A | A | A |
| Uniform formability | A | B | A |
| Aesthetic properties | B | A | A |

TABLE 3

|  | Example 4 |
|---|---|
| Layer A1 resin mixing ratio (% by mass) | polyester A 87% polyester B 10% particle master 3% |
| Layer A2 resin mixing ratio (% by mass) | polyester A 92% polyester B 5% particle master 3% |
| Layer B resin mixing ratio (% by mass) | polyester A 70% polyester B 30% |
| Layer B composition — Glycol component | EG 73.5 mol % BD 25.0 mol % others 1.5 mol % |
| Layer B composition — Acid component | TPA 100 mol % others 0 mol % |
| Film thickness (μm) | 25 |
| Laminate composition | A1/B/A2 |
| Layer thickness ratio | 2:20:3 |
| Film's melting point (° C.) | 248 |
| $F_{100}$ (MPa) 150° C. | 43/57 |
| MD/TD 200° C. | 25/38 |
| Heat shrinkage MD/TD (%) | 0.6/0.1 |
| Film haze (%) | 2.3 |
| Haze after forming (%) | 2.7 |
| Increase in haze by forming | 0.4 |
| Thermoformability | B |
| Uniform formability | A |
| Aesthetic properties | A |

TABLE 4

|  | Comparative example 1 | Comparative example 2 | Comparative example 3 | Comparative example 4 |
|---|---|---|---|---|
| Film resin mixing ratio (% by mass) | polyester A 76% polyester B 20% particle master 4% | polyester B 60% polyester D 39% particle master 1% | polyester D 100% | polyester G 55% polyester H 45% |
| Composition — Glycol component | EG 80.4 mol % BD 18.0 mol % others 1.6 mol % | EG 42.2 mol % BD 56.8 mol % others 1.0 mol % | EG 97.6 mol % BD 0 mol % others 2.4 mol % | EG 56.9 mol % BD 41.8 mol % others 1.3 mol % |
| Acid component | TPA 100 mol % others 0 mol % | TPA 91.6 mol % others 8.4 mol % | TPA 100 mol % others 0 mol % | TPA 93 mol % others 7 mol % |
| Film thickness (μm) | 25 | 25 | 25 | 50 |
| Composition | single layer | single layer | single layer | single layer |
| Film's melting point (° C.) | 253 | 218 | 210 | 220 |
| $F_{100}$ (MPa) 150° C. | 42/73 | 75/91 | 53/44 | 32/20 |
| MD/TD 200° C. | 39/52 | 48/54 | 29/32 | 24/18 |
| Heat shrinkage MD/TD (%) | 2.1/1.0 | 1.8/0.8 | 2.3/1.4 | 5.2/3.7 |
| Film haze (%) | 6.0 | 3.6 | 3.8 | 0.9 |
| Haze after forming (%) | 6.3 | 8.1 | 7.7 | 8.5 |
| Increase in haze by forming | 0.3 | 4.5 | 3.9 | 7.6 |
| Thermoformability | B | C | B | A |
| Uniform formability | C | C | B | B |
| Aesthetic properties | B | C | C | C |

TABLE 5

|  | Comparative example 5 | Comparative example 6 |
|---|---|---|
| Layer A resin mixing ratio (% by mass) |  | polyester A 87% polyester B 10% particle master 3% |
| Layer B resin mixing ratio (% by mass) | polyester A 57.5% polyester B 20% polyester E 20% particle master 2.5% | polyester A 69% polyester B 30% particle master 1% |
| Layer B composition — Glycol component | EG 79.5 mol % BD 18.0 mol % others 2.5 mol % | EG 73.5 mol % BD 25.0 mol % others 1.5 mol % |
| Layer B composition — Acid component | TPA 100 mol % others 0 mol % | TPA 100 mol % others 0 mol % |
| Film thickness (μm) | 25 | 25 |
| Laminate composition | single layer | A/B |
| Layer thickness ratio | — | 3:22 |
| Film's melting point (° C.) | 248 | 248 |
| $F_{100}$ (MPa) 150° C. MD/TD | 31/44 | 42/57 |
| 200° C. MD/TD | 18/19 | 25/38 |
| Heat shrinkage MD/TD (%) | 0.8/0.1 | 0.6/0.1 |
| Film haze (%) | 4.1 | 2.3 |
| Haze after forming (%) | 4.7 | 2.7 |
| Increase in haze by forming | 0.6 | 0.4 |
| Thermoformability | A | B |
| Uniform formability | A | A |
| Aesthetic properties | C | C |

The abbreviations used in the Tables are as described below:

$F_{100}$: stress at 100% elongation
MD: film's longitudinal direction
TD: film's width direction
EG: ethylene glycol residue
BD: 1,4-butanediol residue
TPA: terephthalic acid residue As seen from these Tables, the films produced in Examples which meet the requirements of the invention had high formability, high uniformity in formability, and good appearance before and after the forming process. On the other hand, the films produced in Comparative examples had inferior formability, poor appearance in spite of high formability, or poor appearance due to largely increased haze caused by the forming process.

(11) Luster Degree

The 60° specular luster degree was measured according to the procedures specified in JIS Z 8741(1997) using a digital variable-angle luster meter (UGV-5D manufactured by Suga Test Instruments Co., Ltd.). For observation of metallic laminated film, a neutral filter was place at the acceptance angle to give a 1/10 value. Five measurements were taken. The maximum and the minimum were ignored, and the average of the remaining measurements was adopted as the luster degree of the sample.

(12) Center Line Average Roughness

A super focal depth profilometer microscope (VK-8500 manufactured by Keyence Corporation) was used to measure the two dimensional line roughness at appropriately selected five points in the metal layer, and the measurements were used to determine the center line average roughness. For the measurement, the measured length was 250 μm and the cutoff was 0.08 mm.

(13) Thickness of Metal Layer

The cross section of the metallic laminated film was observed with a field-emission scanning electron microscopy (JSM-6700F manufactured by JEOL Ltd.). Five measurements (400000× magnifications) were taken at appropriately selected points in the center in the film's width direction. The metal layer thickness was determined from their average.

(14) Peel Strength Between Film and Metal Layer

A vinyl chloride/vinyl acetate copolymer adhesive (VM-PEAL manufactured by Dainichiseika Color & Chemicals Mfg. Co., Ltd.) with a bar coater over the metal layer of the metallic laminated film, and dried in a hot-air oven at 80° C. for 20 seconds. A 30 mm×150 mm sample was cut out from the film, and laminated to an acrylic plate with a rolls tamper (220° C., 30 rpm). Cut lines were produced in the laminate sample at intervals of 10 mm, 180° peel test was carried out with a tensile testing machine (Tensilon UCT-100 manufactured by Orientec Co., Ltd.) under the conditions of an initial chuck-to-chuck distance of 100 mm and a tension speed of 300 mm/min. The load required for 10% to 50% elongation was measured, the average of the measurements taken was adopted as peel strength.

(15) Stress at 100% Elongation

A rectangular sample with a 150 mm length in the longitudinal direction and a 10 mm width in the width direction was cut out from the metallic laminated film. Measurements were taken by the same procedures as for the stress at 100% elongation in Paragraph (2).

(16) Appearance of Formed Film

Vacuum forming was performed by the same procedures as for thermoformability in Paragraph (8), and the appearance of the formed metallic film was examined by visual observation. Evaluation was performed according to the criteria described below:

Class A: Change in brightness or appearance not found in metallic film after forming process.
Class B: Spots with reduced transparency found in metallic film after forming process.
Class C: Reduced transparency found all over the surface of metallic film after forming process.

(Plasma Treatment and Sputtering)

The biaxially oriented polyester film was subjected continuously to plasma treatment and sputtering. Specifically, a sample was pulled out from a roll, fed to a sputtering apparatus that equipped a plasma treatment unit and a sputtering unit to perform plasma treatment and sputtering sequentially, and taken up on a roll. Each process was carried out in a vacuum chamber adjusted to 5 MPa or below under the following conditions.

(Plasma Treatment A)
Target: NiCr; electric source: DC pulse; electric power: 5.5 kW,
Gas: $N_2$(200 sccm); treatment rate: 1 m/min
(Plasma Treatment B)
Target: NiCr, electric source: DC pulse, electric power: 4 kW,
Gas: $N_2$ (300 sccm); treatment rate: 1 m/min
(Plasma Treatment C)
Target: NiCr, electric source: DC pulse, electric power: 3 kW,
Gas: $N_2$ (200 sccm); treatment rate: 1 m/min
(Plasma Treatment D)
Target: Ti; electric source: DC pulse; electric power: 3 kW,
Gas: $N_2$ (200 sccm), treatment rate: 1.2 m/min
(Plasma Treatment E)
Target: NiCr; electric source: DC pulse; electric power: 0.5 kW,
Gas: $N_2$ (200 sccm); treatment rate: 1 m/min
(Indium Sputtering)
Target: In; electric source: MF (high frequency); electric power: 13 kW,
Gas: Ar (410 sccm), treatment rate: 1 m/min
(Tin Sputtering)

Target: Sn, electric source: MF (high frequency); electric power: 15 kW,
Gas: Ar (410 sccm); treatment rate: 1 m/min.

Example 5

An A/B/A type three-layer laminated film was produced. A mixture of the polyester A, polyester B and polyester J in the ratio of 40:20:40 by mass was used as the polyester resin that constituted the layer B. A mixture of the polyester A and particle master in the ratio of 98:2 by mass was used as the polyester resin that constituted the layer A.

Each of the polyester resin mixtures was dried in a vacuum dryer at 180° C. for four hours to remove water completely, fed to a separate single screw extruder, and melted at 280° C. Each of them was fed to a filter and gear pump through a separate pipe to remove foreign matters and to ensure a constant extrusion rate. They were combined in a feed block provided at the top of the T-die to produce an A/B/A type laminate (with a thickness ratio of 1:23:1), which was discharged from the T-die onto a cooling drum adjusted to 25° C. to produce a sheet. During this process, a wire-like electrode with a diameter of 0.1 mm was used to apply static electricity to ensure close contact with the drum, and an undrawn film was obtained.

Subsequently, the undrawn film was heated on a heating roller, and at a film temperature of 100° C., drawn 3.1 times in the longitudinal direction, immediately followed by cooling on a metal roll adjusted to 40° C. Then, the film was drawn 3.1 times in the width direction in a tenter type transverse drawing machine under the conditions of a preheat temperature of 70° C. and a drawing temperature of 100° C. In the tenter, the film was heat treated for 5 seconds at 230° C. while being relaxed 4% in the width direction, to provide a biaxially oriented film with a thickness of 25 μm.

The surface of the resulting film was subjected to plasma treatment B, and indium was sputtered over the plasma-treated surface to produce a metallic laminated film.

Example 6

An A/B/A type three-layer laminated film was produced. A mixture of the polyester A, polyester B and polyester J in the ratio of 40:30:30 by mass was used as the polyester resin that constituted the layer B. A mixture of the polyester A and particle master in the ratio of 96.5:3.5 by mass was used as the polyester resin that constituted the layer A.

Subsequently, the same procedure as in Example 5 was carried out except that plasma treatment was performed under the conditions of plasma treatment A to produce a metallic laminated film.

Example 7

An A/B/A type three-layer laminated film was produced. A mixture of the polyester A, polyester B and polyester F in the ratio of 60:30:10 by mass was used as the polyester resin that constituted the layer B. A mixture of the polyester A and particle master in the ratio of 98:2 by mass was used as the polyester resin that constituted the layer A.

Subsequently, the same procedure as in Example 5 was carried out except that plasma treatment was performed under the conditions of plasma treatment D to produce a metallic laminated film.

Examples 8

An A/B/A type three-layer laminated film was produced. A mixture of the polyester A and polyester B in the ratio of 80:20 by mass was used as the polyester resin that constituted the layer B. A mixture of the polyester A and particle master in the ratio of 98.5:1.5 by mass was used as the polyester resin that constituted the layer A.

Subsequently, the same procedure as in Example 5 was carried out except that plasma treatment was performed under the conditions of plasma treatment C to produce a metallic laminated film.

Example 9

An A/B/A type three-layer laminated film was produced. A mixture of the polyester A, polyester B and polyester J in the ratio of 40:20:40 by mass was used as the polyester resin that constituted the layer B. A mixture of the polyester A and particle master in the ratio of 98:2 by mass was used as the polyester resin that constituted the layer A.

Subsequently, the same procedure as in Example 5 was carried out except that plasma treatment was performed under the conditions of plasma treatment D and that tin was used for sputtering, to produce a metallic laminated film.

Example 10

An A/B/A type three-layer laminated film was produced. A mixture of the polyester A and polyester F in the ratio of 65:35 by mass was used as the polyester resin that constituted the layer B. A mixture of the polyester A and particle master in the ratio of 98.5:1.5 by mass was used as the polyester resin that constituted the layer A.

Subsequently, the same procedure as in Example 5 was carried out to produce a metallic laminated film.

Example 11

An A/B/A type three-layer laminated film was produced. A mixture of the polyester A and polyester F in the ratio of 70:30 by mass was used as the polyester resin that constituted the layer B. A mixture of the polyester A, polyester J and particle master in the ratio of 93.5:4:2.5 by mass was used as the polyester resin that constituted the layer A.

Subsequently, the same procedure as in Example 5 was carried out except that plasma treatment was performed under the conditions of plasma treatment C to produce a metallic laminated film.

Example 12

An A/B/A type three-layer laminated film was produced. A mixture of the polyester A, polyester B and polyester J in the ratio of 55:40:5 by mass was used as the polyester resin that constituted the layer B. A mixture of the polyester A, polyester B and particle master in the ratio of 95.5:3:1.5 by mass was used as the polyester resin that constituted the layer A.

Subsequently, the same procedure as in Example 5 was carried out to produce a metallic laminated film.

Example 13

An A1/B/A2 type three-layer laminated film was produced. A mixture of the polyester A, polyester B and particle master in the ratio of 88:10:2 by mass was used as the polyester resin that constituted the layer A1. A mixture of the polyester A, polyester B and particle master in the ratio of 93:5:2 by mass was used as the polyester resin for the layer A2. A mixture of the polyester A, polyester B and polyester J in the ratio of 40:20:40 by mass was used as the polyester resin that constituted the layer B.

Each of the polyester resin mixtures was dried in a vacuum dryer at 180° C. for four hours to remove water completely, fed to a separate single screw extruder, and melted at 280° C. Each of them was fed to a filter and gear pump through a separate pipe to remove foreign matters and to ensure a constant extrusion rate. They were combined in a feed block provided at the top of the T-die to produce an A1/B/A2 type laminate (with a thickness ratio of 2:21:2), which was discharged from the T-die onto a cooling drum adjusted to 25° C. to produce a sheet. During this process, a wire-like electrode with a diameter of 0.1 mm was used to apply static electricity to ensure close contact with the drum, and an undrawn film was obtained.

Subsequently, the undrawn film was heated on a heating roller, and at a film temperature of 100° C., drawn 3.1 times in the longitudinal direction, immediately followed by cooling on a metal roll adjusted to 40° C. Then, the film was drawn 3.1 times in the width direction in a tenter type transverse drawing machine under the conditions of a preheat temperature of 70° C. and a drawing temperature of 100° C. In the tenter, the film was heat treated for 5 seconds at 230° C. while being relaxed 4% in the width direction, to provide a biaxially oriented film with a thickness of 25 μm.

The A1 surface of the resulting film was subjected to plasma treatment B, and indium was sputtered over the plasma-treated surface to produce a metallic laminated film.

Comparative Example 7

An A/B/A type three-layer laminated film was produced. A mixture of the polyester A and polyester B in the ratio of 55:45 by mass was used as the polyester resin that constituted the layer B. A mixture of the polyester A and particle master in the ratio of 97:3 by mass was used as the polyester resin that constituted the layer A.

Each of the polyester resin mixtures was dried in a vacuum dryer at 180° C. for four hours to remove water completely, fed to a separate single screw extruder, and melted at 280° C. Each of them was fed to a filter and gear pump through a separate pipe to remove foreign matters and to ensure a constant extrusion rate. They were combined in a feed block provided at the top of the T-die to produce an A/B/A type laminate (with a thickness ratio as shown in Table), which was discharged from the T-die onto a cooling drum adjusted to 25° C. to produce a sheet. During this process, a wire-like electrode with a diameter of 0.1 mm was used to apply static electricity to ensure close contact with the drum, and an undrawn film was obtained.

Subsequently, the undrawn film was heated on a heating roller, and at a film temperature of 100° C., drawn 3.1 times in the longitudinal direction, immediately followed by cooling on a metal roll adjusted to 40° C. Then, the film was drawn 3.1 times in the width direction in a tenter type transverse drawing machine under the conditions of a preheat temperature of 75° C. and a drawing temperature of 105° C. In the tenter, the film was heat treated for 5 seconds at 210° C. while being relaxed 4% in the width direction, to provide a biaxially oriented film with a thickness of 25 μm.

The surface of the resulting film was subjected to plasma treatment B, and tin was sputtered over the plasma-treated surface to produce a metallic laminated film.

Comparative Example 8

An A/B/A type three-layer laminated film was produced. A mixture of the polyester A, polyester B and polyester D in the ratio of 40:20:40 by mass was used as the polyester resin that constituted the layer B. A mixture of the polyester A and particle master in the ratio of 98:2 by mass was used as the polyester resin that constituted the layer A.

Subsequently, without performing plasma treatment, the same procedure as in Example 5 was carried out except that indium was sputtered to produce a metallic laminated film.

Comparative Example 9

A single layer film comprising the layer B alone was produced. A mixture of the polyester A and particle master in the ratio of 95:5 by mass was used as the polyester resin that constituted the layer.

Subsequently, the same procedure as in Example 5 was carried out except that plasma treatment was performed under the conditions of plasma treatment E to produce a metallic laminated film.

Comparative Example 10

An A/B/A type three-layer laminated film was produced. A mixture of the polyester A and polyester D in the ratio of 20:80 by mass was used as the polyester resin that constituted the layer B. A mixture of the polyester A and particle master in the ratio of 95.5:4.5 by mass was used as the polyester resin that constituted the layer A.

Subsequently, the same procedure as in Example 5 was carried out except that plasma treatment was performed under the conditions of plasma treatment C to produce a metallic laminated film.

TABLE 6

| | Examples 5 | Examples 6 | Examples 7 | Examples 8 |
|---|---|---|---|---|
| Layer A resin mixing ratio (% by mass) | polyester A 98% particle master 2% | polyester A 96.5% particle master 3.5% | polyester A 98% particle master 2% | polyester A 98.5% particle master 1.5% |
| Layer B resin mixing ratio (% by mass) | polyester A 40% polyester B 20% polyester J 40% | polyester A 40% polyester B 30% polyester J 30% | polyester A 40% polyester B 20% polyester E 40% | polyester A 80% polyester B 20% |
| Film thickness (μm) | 25 | 20 | 30 | 25 |
| Laminate composition | A/B/A | A/B/A | A/B/A | A/B/A |
| Layer thickness ratio | 1:23:1 | 1:18:1 | 3:54:3 | 1:23:1 |
| Metal layer | indium | indium | indium | indium |
| Pretreatment conditions | plasma treatment B | plasma treatment A | plasma treatment D | plasma treatment C |
| Film's melting point (° C.) | 249 | 247 | 248 | 254 |
| $F_{100}$ (MPa) 150° C. MD/TD | 34/39 | 24/35 | 30/39 | 40/57 |
| 200° C. | 20/22 | 11/19 | 14/20 | 31/48 |
| Film haze (%) | 2.3 | 4.8 | 2.6 | 1.9 |
| Metal layer thickness (nm) | 70 | 70 | 60 | 70 |

TABLE 6-continued

|  | Examples 5 | Examples 6 | Examples 7 | Examples 8 |
|---|---|---|---|---|
| Center line average roughness (nm) | 23 | 18 | 38 | 29 |
| Film/metal layer adhesion (N/10 mm) | 7.5 | 8.4 | 5.2 | 6.7 |
| Luster degree | 740 | 579 | 669 | 764 |
| Aesthetic properties | A | B | A | A |
| Thermoformability | A | A | A | B |
| Uniform formability | A | A | A | A |
| Appearance after forming | A | A | B | A |

TABLE 7

|  | Examples 9 | Examples 10 | Examples 11 | Examples 12 |
|---|---|---|---|---|
| Layer A resin mixing ratio (% by mass) | polyester A 98% particle master 2% | polyester A 98.5% particle master 1.5% | polyester A 93.5% polyester J 4.0% particle master 2.5% | polyester A 95.5% polyester B 3.0% particle master 1.5% |
| Layer B resin mixing ratio (% by mass) | polyester A 40% polyester B 20% polyester J 40% | polyester A 65% polyester B 35% | polyester A 70% polyester F 30% | polyester A 55% polyester B 40% polyester J 5% |
| Film thickness (μm) | 25 | 20 | 30 | 25 |
| Laminate composition | A/B/A | A/B/A | A/B/A | A/B/A |
| Layer thickness ratio | 1:18:1 | 3:46:3 | 1:23:1 | 1:13:1 |
| Metal layer | tin | indium | indium | indium |
| Pretreatment conditions | plasma treatment D | plasma treatment B | plasma treatment C | plasma treatment B |
| Film's melting point (° C.) | 249 | 254 | 251 | 252 |
| $F_{100}$ (MPa) 150° C. MD/TD | 38/44 | 25/49 | 38/56 | 21/52 |
| 200° C. MD/TD | 24/29 | 15/25 | 27/34 | 13/30 |
| Film haze (%) | 2.3 | 1.9 | 3.3 | 1.6 |
| Metal layer thickness (nm) | 60 | 70 | 70 | 70 |
| Center line average roughness (nm) | 31 | 19 | 27 | 16 |
| Film/metal layer adhesion (N/10 mm) | 4.9 | 7.2 | 6.4 | 8.1 |
| Luster degree | 640 | 712 | 589 | 698 |
| Metallic properties | B | A | A | A |
| Thermoformability | A | A | B | A |
| Uniform formability | A | B | A | B |
| Appearance after forming | B | A | A | A |

TABLE 8

|  | Comparative example 7 | Comparative example 8 | Comparative example 9 | Comparative example 10 |
|---|---|---|---|---|
| Layer A resin mixing ratio (% by mass) | polyester A 97% particle master 3% | polyester A 98% particle master 2% |  | polyester A 95.5% particle master 4.5% |
| Layer B resin mixing ratio (% by mass) | polyester A 55% polyester B 45% | polyester A 40% polyester B 20% polyester J 40% | polyester A 96.5% particle master 3.5% | polyester A 20% polyester J 80% |
| Film thickness (μm) | 20 | 20 | 30 | 25 |
| Laminate composition | A/B/A | A/B/A | single layer | A/B/A |
| Layer thickness ratio | 1:18:1 | 1:18:1 | — | 1:23:1 |
| Metal layer | tin | indium | indium | indium |
| Pretreatment conditions | plasma treatment A | — | plasma treatment C | plasma treatment E |
| Film's melting point (° C.) | 251 | 249 | 255 | 243 |
| $F_{100}$ (MPa) 150° C. MD/TD | 18/63 | 34/41 | 84/98 | 43/54 |
| 200° C. MD/TD | 8/37 | 19/22 | 48/66 | 37/43 |
| Film haze (%) | 2.9 | 2.2 | 5.8 | 4.7 |
| Metal layer thickness (nm) | 70 | 60 | 60 | 70 |
| Center line average roughness (nm) | 20 | 51 | 43 | 25 |
| Film/metal layer adhesion (N/10 mm) | 7.7 | 2.9 | 6.8 | 3.4 |
| Luster degree | 692 | 391 | 417 | 557 |
| Metallic properties | B | C | C | B |
| Thermoformability | B | A | C | B |
| Uniform formability | C | A | A | A |
| Appearance after forming | A | C | B | C |

TABLE 9

|  | Examples 13 |
| --- | --- |
| Layer A1 resin mixing ratio (% by mass) | polyester A 88% polyester B 10% particle master 2% |
| Layer A2 resin mixing ratio (% by mass) | polyester A 93% polyester B 5% particle master 2% |
| Layer B resin mixing ratio (% by mass) | polyester A 40% polyester B 20% polyester J 40% |
| Film thickness (μm) | 25 |
| Laminate composition | A1/B/A2 |
| Layer thickness ratio | 2:21:2 |
| Metal layer | indium |
| Pretreatment conditions | plasma treatment B |
| Film's melting point (° C.) | 249 |
| $F_{100}$(MPa)   150° C. | 34/39 |
| MD/TD           200° C. | 20/22 |
| Film haze (%) | 2.3 |
| Metal layer thickness (nm) | 70 |
| Center line average roughness (nm) | 23 |
| Film/metal layer adhesion (N/10 mm) | 7.5 |
| Luster degree | 740 |
| Metallic properties | A |
| Thermoformability | A |
| Uniform formability | A |
| Appearance after forming | A |

Thus, the biaxially oriented polyester film requires only a small deforming stress during thermoforming to permit easy forming, and has a high dimensional stability at high temperatures, making it possible to perform uniform metal deposition easily. Furthermore, the film suffers little changes in appearance during thermoforming and therefore can be useful as material for formed parts with a plated metal-like appearance.

INDUSTRIAL APPLICABILITY

Our biaxially oriented polyester films have high formability, serve for easy production of formed parts that closely meet the shape of the die during the thermoforming process such as vacuum forming and air-pressure forming, and suffer little change in appearance of the film during the thermoforming process. With a metal layer at least on one side, the metallic laminated films have a good metallic appearance. They also have high formability and suffer little change in appearance during the forming process. Thus, resulting formed parts will have a plated metal-like appearance, and can be used preferably as components of automobiles, electric appliances, etc.

The invention claimed is:

1. A biaxially oriented polyester film comprising at least three polyester resin layers A1/B/A2, and having a melting point in the range of 246 to 270° C., wherein a major component of the layers A1 and A2 is polyethylene terephthalate and the stress at 100% elongation in the longitudinal direction and width direction of the film at 150° C. and 200° C. meets the following equations 1 and 2:

$$2 \leq (F100_{MD} + F100_{TD}) \leq 100 \tag{1}$$

$$1 \leq F100_{TD} \leq 60 \tag{2},$$

where $F100_{MD}$ is the stress at 100% elongation in the longitudinal direction (MPa) of the film,
$F100_{TD}$ is the stress at 100% elongation in the width direction (MPa) of the film and wherein ethylene glycol residue, 1,4-butanediol residue and other glycol residue account for 60 to 90 mol %, 15 to 30 mol % and 1 to 5 mol %, respectively, of the glycol residue of the polyester resin that constitute the layer B, and terephthalic acid residue accounts for 95 mol % or more of the dicarboxylic acid residue of the polyester resin that constitutes the layer B.

2. The biaxially oriented polyester film as defined in claim 1, wherein haze of the film is in the range of 0.1 to 5%.

3. The biaxially oriented polyester film as defined in claim 1, wherein haze of the film drawn 1.4 times at 200° C. in both the longitudinal direction and the width direction is in the range of 0.01 to 3%.

4. The biaxially oriented polyester film as defined in claim 1, further comprising a weathering resistant resin layer at least on one side.

5. The biaxially oriented polyester film as defined in claim 1, wherein a major component of the layers A1 and A2 is polyethylene terephthalate in which ethylene terephthalate units account for 90 mol % or more.

6. A biaxially oriented polyester film comprising at least three polyester resin layers A1/B/A2, and having a melting point in the range of 246 to 270° C., wherein a major component of the layers A1 and A2 is polyethylene terephthalate and the film is a metallic laminated film comprising a metal layer at least on one side of the film, adhesion between the film and the metal layer being 3.5 N/10 mm or more, and stress at 100% elongation in the longitudinal direction and width direction of the film at 150° C. and 200° C. meets the following equations 1 and 2:

$$2 \leq (F100_{MD} + F100_{TD}) \leq 100 \tag{1}$$

$$1 \leq F100_{TD} \leq 60 \tag{2},$$

where $F100_{MD}$ is the stress at 100% elongation in the longitudinal direction (MPa) of the film,
$F100_{TD}$ is the stress at 100% elongation in the width direction (MPa) of the film and wherein ethylene glycol residue, 1,4-butanediol residue and other glycol residue account for 60 to 90 mol %, 15 to 30 mol % and 1 to 5 mol %, respectively, of the glycol residue of the polyester resin that constitute the layer B, and terephthalic acid residue accounts for 95 mol % or more of the dicarboxylic acid residue of the polyester resin that constitutes the layer B.

7. The metallic laminated film as defined in claim 6, wherein the metal layer comprises a metal compound with a melting point in the range of 150 to 400° C.

8. The metallic laminated film as defined in claim 6, wherein the metal layer comprises indium.

9. The metallic laminated film as defined in claim 6, further comprising a weathering resistant resin layer on a side opposite the metal layer.

10. The metallic laminated film as defined in claim 6, wherein center line average roughness of the metal layer is in the range of 1 to 40 nm.

11. The metallic laminated film as defined in claim 6, wherein luster degree measured from the side opposite to the metal layer is in the range of 400 to 900.

12. The metallic laminated film as defined in claim 6, wherein a major component of the layers A1 and A2 is polyethylene terephthalate in which ethylene terephthalate units account for 90 mol % or more.

* * * * *